No. 775,994. PATENTED NOV. 29, 1904.
W. A. SMITH.
SPOOL OR THE LIKE.
APPLICATION FILED JAN. 18, 1904.
NO MODEL.
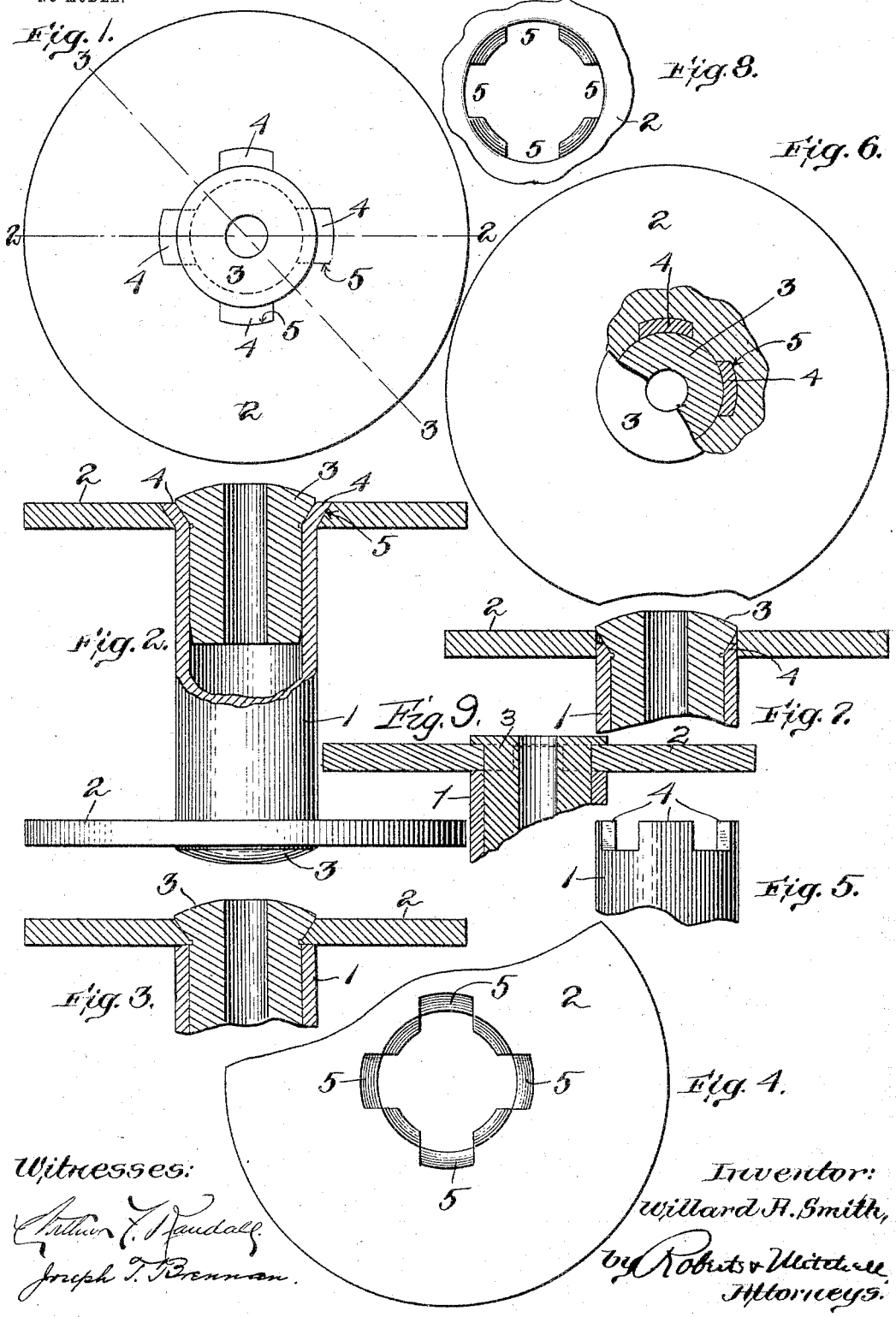
Witnesses:
Arthur T. Randall.
Joseph T. Brennan.
Inventor:
Willard A. Smith,
by Roberts & Mitchell,
Attorneys.

No. 775,994. Patented November 29, 1904.

UNITED STATES PATENT OFFICE.

WILLARD A. SMITH, OF PORTSMOUTH, NEW HAMPSHIRE, ASSIGNOR TO MORLEY BUTTON MANUFACTURING COMPANY, OF SACO, MAINE, A CORPORATION OF MAINE.

SPOOL OR THE LIKE.

SPECIFICATION forming part of Letters Patent No. 775,994, dated November 29, 1904.

Application filed January 18, 1904. Serial No. 189,408. (No model.)

*To all whom it may concern:*

Be it known that I, WILLARD A. SMITH, a citizen of the United States, and a resident of Portsmouth, in the county of Rockingham and State of New Hampshire, have invented new and useful Improvements in Spools or the Like, of which the following is a specification.

My invention relates to spools, bobbins, and the like, and particularly to articles of this class made of several parts joined together. Such spools and the like usually comprise a barrel and two flanges fastened thereto by plugs extending through the flanges into the ends of the barrel; but it has heretofore been difficult, if not impossible, to fasten the flanges to the barrel so that they would not work loose in a comparatively short while and turn relatively to the barrel.

It is the principal object of my invention to improve the construction of spools and the like made of separate parts, as described, to the end that the flanges will be prevented from working loose and turning relatively to the barrel and to provide a spool possessing this characteristic which will be of simple and cheap construction.

The distinguishing features of my improved spool are that each end of the barrel is made with one or more tongues, and the flanges are each made with a corresponding number of sockets or grooves upon its inner periphery, into which the tongues extend and are held by the plug. All three elements of the spool—namely, the barrel, flange, and the plug—are thereby positively and directly connected each with the other, affording an unusually strong and effective article. In the best form of my invention the plug is made with a head beveled on its inner face. The central opening of the flange and the inner or bottom face of the sockets or grooves are also beveled, so that when the plug is driven through the flange into the end of the barrel the tongues in the latter are bent or turned so as to fit into the beveled sockets. This construction not only locks the barrel and flange against relative rotary movement, but also securely prevents the flange and barrel being separated.

In the accompanying drawings, Figure 1 is an end view of a spool embodying one form of my invention. Fig. 2 is a section on line 2 2 of Fig. 1. Fig. 3 is a section on line 3 3 of Fig. 1. Fig. 4 is a face view, partly broken away, of one of the flanges of the spool shown in Figs. 1, 2, and 3. Fig. 5 is a side view of one end of the barrel of the spool shown in Figs. 1, 2, and 3. Fig. 6 is an end view, partly in section, of a spool embodying another form of my invention. Fig. 7 is a section on line 7 7 of Fig. 6. Fig. 8 shows separately in plan view the middle portion of one of the flanges of the spool shown in Fig. 6. Fig. 9 shows a modification and is hereinafter described.

My improved spool comprises a hollow barrel 1, two flanges 2 2, and two plugs 3 3, which is the same number of parts heretofore employed.

Referring to that form of my invention shown in Figs. 1 to 5, inclusive, 1 represents a barrel made with tongues 4 at each end, which register with four beveled sockets 5 upon the inner periphery of each flange 2, said inner periphery being also beveled. Each plug 3 is made with a cylindrical shank and a head beveled upon its inner or under side. In assembling the parts of the spool the tongues 4 are entered in the sockets 5 and the shank of the plug 4 driven through the flange into the end of the barrel after cement has been applied to said shank and to the interior of the barrel. As the beveled head of plug 3 is driven in between the tongues 4 the latter are turned outwardly, so as to fit into the beveled socket 5, as shown in Fig. 2, so that they cannot be drawn out of said sockets by any reasonable force tending to separate the flanges from the barrel. The employment of the tongues and sockets also locks the barrel and flange against relative rotary movement. By this means I have provided an exceedingly strong spool capable of withstanding very hard usage and one that is simple in its construction and cheap to manufacture.

In Figs. 6, 7, and 8 I have shown another form of my invention, which differs from that shown in Figs. 1 to 5, inclusive, only in that the inner faces of the sockets 5 are straight instead of beveled and the tongues 4 are relatively shorter, so that they will not prevent the beveled head of plug 3 from seating upon the beveled inner periphery of the flange and yet may be clamped more or less at their outer ends in the sockets 5 by the beveled head of the plug. It is not, however, essential with this form of my invention that the head of the plug be beveled. If the head be flat, as in Fig. 9, the tongues 4 could extend through the flange. The parts are assembled in the same manner as above described, the tongues preventing the flange from being turned upon the barrel and the headed plug glued to the interior of the barrel, preventing the flange from coming off from the end of the barrel.

What I claim is—

1. A spool or the like comprising a hollow barrel made at each end with longitudinally-extending tongues; two flanges one at each end of the barrel, each provided upon its inner periphery with sockets or recesses corresponding with and holding the tongues of the adjacent end of the barrel, said sockets being of a depth equal to the thickness of the tongues; and a plug in the central opening of each flange for holding the prongs in the sockets; the barrel, flange and plug being positively and directly connected each with both of the others.

2. A spool or the like comprising a hollow barrel made at each end with longitudinally-extending tongues; two flanges one at each end of the barrel, each having its inner periphery beveled and being provided with sockets or recesses corresponding with and holding the tongues of the adjacent end of the barrel, said sockets being of a depth equal to the thickness of said tongues; and a plug in each end of the barrel made with a beveled head, said barrel, flange and plug being directly and positively connected each with both of the others.

3. A spool or the like comprising a hollow barrel made at each end with longitudinally-extending tongues; two flanges one at each end of the barrel, each having its inner periphery beveled and being provided with one or more beveled sockets or recesses corresponding with and holding the prongs of the adjacent end of the barrel; and a plug in each end of the barrel made with a beveled head; said barrel, flange and plug being each positively and directly connected with both of the others.

Signed by me at Portsmouth, New Hampshire, this 7th day of January, 1904.

WILLARD A. SMITH.

Witnesses:
 JOHN PENDER,
 W. E. BENNETT.